(12) United States Patent
Kuwabara (10) Patent No.: US 7,206,209 B2
(45) Date of Patent: Apr. 17, 2007

(54) SWITCHING POWER SUPPLY APPARATUS WITH ERROR AMPLIFICATION CONTROL

(75) Inventor: Kesanobu Kuwabara, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 225 days.

(21) Appl. No.: 10/772,968

(22) Filed: Feb. 5, 2004

(65) Prior Publication Data
US 2004/0252528 A1    Dec. 16, 2004

(30) Foreign Application Priority Data
Feb. 6, 2003  (JP)  ............................. 2003-029833
Dec. 1, 2003  (JP)  ............................. 2003-400970

(51) Int. Cl.
*H02M 3/335*   (2006.01)
(52) U.S. Cl. .................. 363/21.11; 363/71; 363/97
(58) Field of Classification Search ............. 363/21.04, 363/21.1, 21.11, 71, 97
See application file for complete search history.

(56) References Cited

U.S. PATENT DOCUMENTS

| | | | | |
|---|---|---|---|---|
| 3,697,717 | A | * | 10/1972 | Kornrumpf et al. ........ 219/625 |
| 4,559,590 | A | * | 12/1985 | Davidson ................. 363/21.02 |
| 4,695,935 | A | * | 9/1987 | Oen et al. ................... 363/21.1 |
| 5,903,448 | A | * | 5/1999 | Davila, Jr. .................... 363/24 |
| 6,297,972 | B1 | * | 10/2001 | Chen ............................ 363/37 |
| 6,667,893 | B2 | * | 12/2003 | Daun-Lindberg et al. ..... 363/65 |

FOREIGN PATENT DOCUMENTS

| | | |
|---|---|---|
| JP | 9-131055 A | 5/1997 |
| JP | 11-196572 A | 7/1999 |

\* cited by examiner

*Primary Examiner*—Jeffrey Sterrett
(74) *Attorney, Agent, or Firm*—Rossi, Kimms & McDowell LLP (57) ABSTRACT

A switching power source device can enhance the power factor by increasing the conduction angle of an input current in a wide input voltage range, while obviating the increase of size and the increase of cost thereof, and lower the switching loss by removing higher harmonic waves from the input current. The device includes at least first, second, and third series circuits constituted of a rectifying circuit, at least first and second primary windings, a plurality of diodes, a smoothing capacitor, and first and second switching elements. The device further includes an error amplifier, which outputs an error amplified signal, and a control circuit that performs a PWM control of the switching element in response to a first modulated wave that is generated based on an inverted and amplified waveform, which is the product of the error amplified signal and a full-wave rectified waveform of an AC input voltage, and performs a PWM control of the switching element in response to a second modulated wave that is generated based on the error amplified signal and the full-wave rectified waveform of the AC input voltage to alternately turn ON and OFF the both switching elements.

23 Claims, 6 Drawing Sheets

SWITCHING POWER SUPPLY APPARATUS WITH ERROR AMPLIFICATION CONTROL

BACKGROUND

Figure 5:
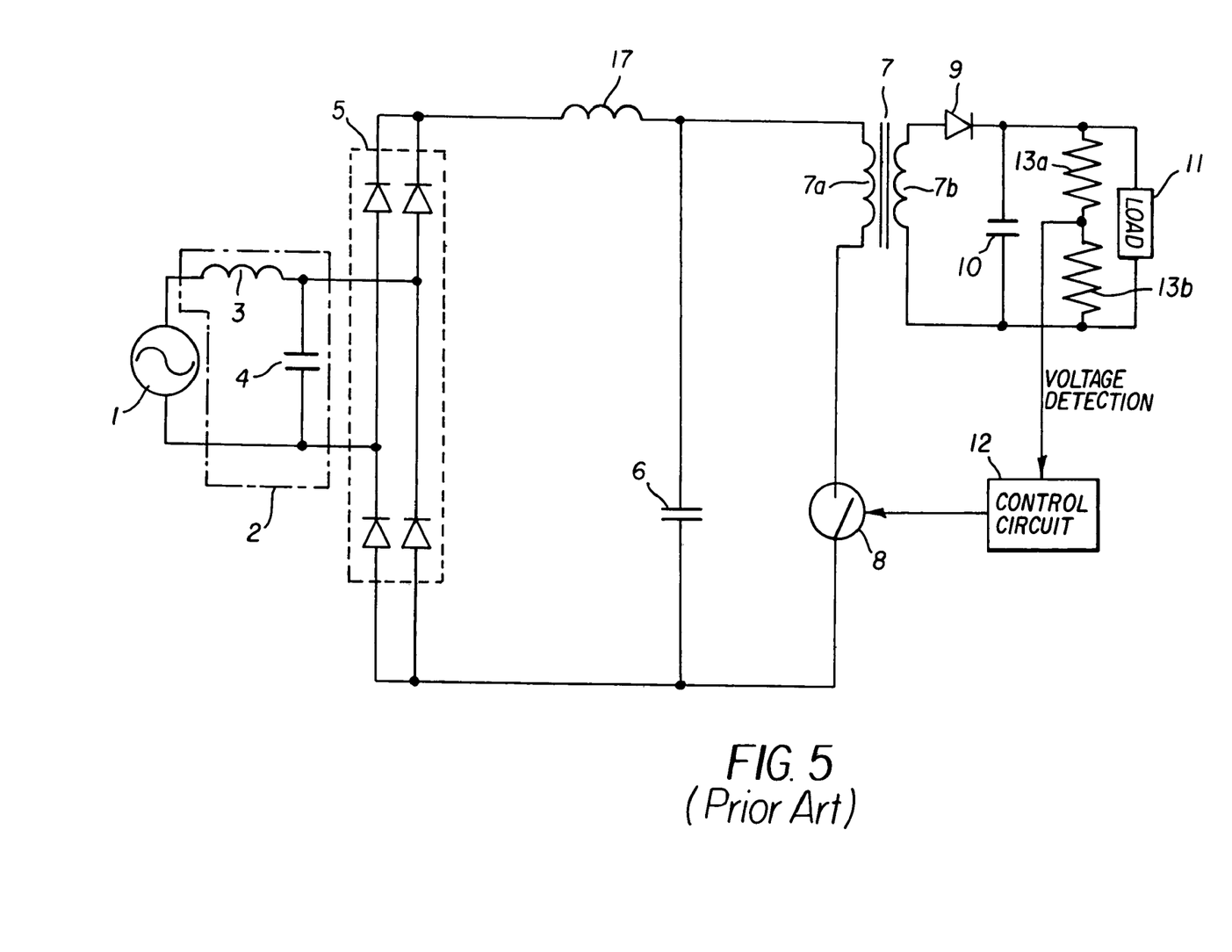
FIG. 5 illustrates a circuit diagram of a conventional switching power source device.

FIG. 5 illustrates a switching power source device that improves an input power factor using a choke input-type smoothing circuit, as disclosed in Japanese Unexamined Patent Publication Hei-9 (1997)-131055. In the embodiment of FIG. 5, the switching power source device includes an AC power source 1, a noise filter 2, which is constituted of a reactor 3 and a capacitor 4, a bridge rectifying circuit 5, a smoothing capacitor 6, a transformer 7, a primary-side (hereafter "primary") winding 7a of the transformer 7, a secondary-side (hereafter "secondary") winding 7b of the transformer 7, a first switching element 8, a diode 9, a smoothing capacitor 10, a load 11, a control circuit 12 that performs an ON-OFF control of the switching element 8, resistances 13a, 13b for voltage detection, and a choke coil 17.

In the above-mentioned embodiment, the AC voltage supplied from the AC power source 1 is subjected to the full-wave rectification by the bridge rectifying circuit 5 through the noise filter 2. The full-wave rectified voltage output from the bridge rectifying circuit 5 is smoothed by the choke-input type smoothing circuit, which is constituted of the choke coil 17 and the smoothing capacitor 6. The first primary winding 7a of the transformer 7 and the switching element 8 are connected in series, and these elements are connected to both ends of the capacitor 6. The voltage smoothed by the smoothing circuit is interrupted by turning ON and OFF the switching element 8. The interrupted voltage is smoothed by the diode 9 and the smoothing capacitor 10 through the secondary winding 7b of the transformer 7 and thereafter, is supplied to the load 11 as a fixed DC voltage.

Here, the control circuit 12 performs an ON-OFF control of the switching element 8 to set the DC voltage supplied to the load 11 to a substantially fixed value. The DC voltage supplied to the load 11 is detected by resistances 13a, 13b and the detected value is compared with a predetermined voltage set value or the like in the control circuit 12. Then, an ON-OFF duty cycle of the switching element 8 is controlled based on a PWM (Pulse Width Modulation) control or the like to eliminate the deviation between both voltages.

A charging current is supplied to the smoothing capacitor 6 from the AC power source 1 through the noise filter 2, the bridge rectifying circuit or device 5, and the choke coil 17. The charging current has its peak value suppressed in response to an inductance value of the choke coil 17 while prolonging the a current supply period. That is, since the charging current that flows into the smoothing capacitor 6 is smoothed by the choke coil 17, the power factor is improved.

Figure 6:
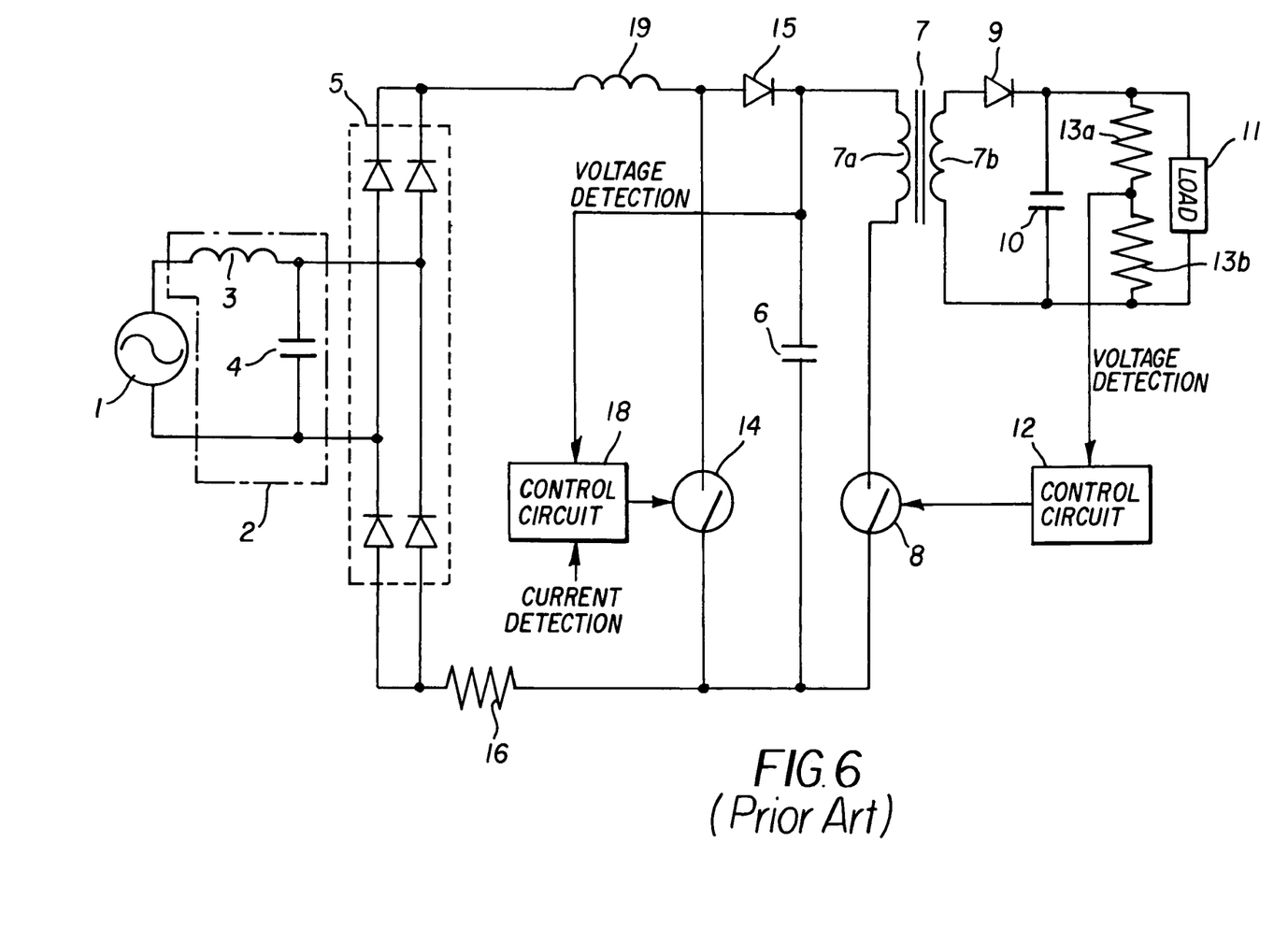
FIG. 6 illustrates a circuit diagram of another conventional switching power source device.

FIG. 6 illustrates another switching power source device that uses a so-called PFC (Power Factor Correction) method, where a power factor is set to a value substantially equal to 1 by converting an input current into an approximately sinusoidal wave, while eliminating the higher harmonic components in the input current, as disclosed in Japanese Unexamined Patent Publication Hei-11 (1999)-196572. The embodiment of FIG. 6 is similar to that of FIG. 5, but it further includes a second switching element 14, a diode 15, a current detection resistance 16, a second control circuit 18, and an inductor 19. Here, the voltage of the smoothing capacitor 6 and the current detection value obtained by the current detection resistance 16 are input to the second control circuit 18, and an ON-OFF control of the second switching element 14 is performed based on these input signals.

The inductor 19, the second switching element 14, the diode 15, the smoothing capacitor 6, the current detection resistance 16, and the second control circuit 18 constitute a booster converter. The input current waveform is formed into a sinusoidal waveform by performing the PWM control of the switching element 14 by the control circuit 18, the higher harmonic components are removed, while improving the input power factor such that a value substantially equal to 1 is realized as the power factor.

The noise filter 2 shown in FIGS. 5 and 6 is constituted of the reactor 3 and the capacitor 4. Although not shown in the drawing, the noise filter also connects a capacitor to a power source side of the reactor 3, as is well known. This constitution is referred to as "a normal mode noise filter" and has a function of removing the normal mode noise current flowing in positive-side and negative-side output lines of the bridge rectifying circuit 5.

Further, although not shown in the drawing, an in-phase reactor provided with two windings having the same polarity on the same core can be used in place of the reactor 3, with the two windings are respectively grounded through capacitors. Such a structure is referred to as an in-plane noise filter (a common mode noise filter) and the noise filter has a function of removing the common mode noise current flowing between positive-side/negative-side output lines of the bridge rectifying circuit 5 and the ground in response to turning ON and OFF of the switching element 8.

To the choke coil 17 of the switching power source device shown in FIG. 5, a pulse current obtained by the full-wave rectification of an AC current from the AC power source 1 is applied. The frequency of the pulse current is twice as large as a commercial frequency and hence, it is necessary for the choke coil 17 to induce a large inductance value of several mH or greater. However, the choke coil having the large inductance value has a larger shape and a larger weight, which hamper the miniaturization and the reduction of weight. Further, it is necessary to increase the number of turns of the choke coil to obtain a larger inductance value, and hence, a voltage drop due to the resistance of the winding is increased, lowering the DC intermediate voltage between both ends of the smoothing capacitor 6. Accordingly, an effective current flowing in the switching element 8 is increased, and hence, several drawbacks arise, including increase in a switching loss and lowered efficiency of the switching power source device as the power source device.

Although the switching power source device shown in FIG. 6 can obtain the power factor of substantially 1, it is necessary to provide two control circuits for the switching element, and hence, the circuit constitution becomes complicated, increasing the cost. On the other hand, not many applications require the total removal of higher harmonic components contained in the input current while holding the power factor as substantially 1. Particularly, with respect to the higher harmonic components, it is sufficient to reduce the higher harmonic components to a value equal to or less than a value determined by standards or the like in many applications, and hence, the switching device shown in FIG. 6 is wasteful with respect to the functions and the cost.

Accordingly, there remains a need for a switching power source device that can obviate the increase of size and the increase of cost of the device by making a choke coil and the like unnecessary. Further, there remains a need for a switching power source device that can improve the power factor by increasing a conduction angle of an input current in a wide input voltage range. Further, there remains a need for a switching power source device that can remove higher harmonic components of an input current at a level sufficient for practical use, while achieving high operating efficiency by reducing the switching loss. The present invention addresses these needs.

SUMMARY OF THE INVENTION

The present invention relates to a switching power source device that can supply a desired DC voltage to a load, and with and improved input power factor.

The present switching power source device includes a rectifying circuit or device that is or can be connected to an AC power source and a smoothing capacitor connected to the output side (i.e., positive and negative output (terminals or lines)) of the rectifying device. Between the positive and negative outputs of the rectifying device, the smoothing capacitor is directly or indirectly connected through diodes.

The present switching power source device includes a transformer having at least first and second primary windings, and a secondary winding, and first and second switching elements. The transformer also can include a third primary winding. The first and second switching elements are connected to the rectifying device. Specifically, these switching elements are connected to the output of the rectifying device by way of the first and second primary windings of the transformer respectively.

At least the first primary winding, the rectifying device, and the first switching element form one series circuit, and at least the second primary winding, the rectifying device, and the second switching element form another series circuit. The one series circuit further includes at least first and second diode connected in series, and the another series circuit further includes a third diode. The one and another series circuits are connected in parallel in relation to the rectifying device. These series circuits also can include the third primary winding.

The switching power source device further includes yet another series circuit formed of the first primary winding, the second diode, the smoothing capacitor, and the first switching element. It also can include yet another series circuit formed of the smoothing capacitor, the first diode, and the rectifying device. The latter series circuit also can include the third primary winding; the third primary winding, the first diode, the second diode, and the first primary winding are connected in series.

The switching power source device further includes a control circuit or device that alternately turns ON and OFF the first and second switching elements. It also can include means for rectifying and smoothing a voltage generated to the secondary winding of the transformer, and means for outputting error amplified signal for setting a DC current output from the rectifying and smoothing means to a predetermined value. The control device can alternately turn ON and OFF the first and second switching elements based on the error amplified signal and an input voltage from the AC power source.

The control device can perform a PWM control of the first switching element in response to a first modulated wave generated based on an inverted and amplified waveform, which is a product of the error amplified signal and a full-wave rectified waveform of an input voltage from the AC power source, perform a PWM control of the second switching element in response to a second modulated wave generated based on the error amplified signal and the full-wave rectified waveform of the input voltage from the AC power source, and turns ON and OFF the first and second switching elements alternately.

The control device can include an inverting and amplifying circuit and a first comparator circuit. The inverting and amplifying circuit outputs a signal obtained by inverting and amplifying a multiplication value of the error amplified signal and a peak value of an output voltage of the rectifying device by ½ times, as a first modulated wave. The first comparator circuit compares the first carrier wave, which is generated separately, and the first modulated wave. The first switching element can be controlled in response to an output of the first comparator circuit.

The control device further includes a multiplication circuit and a second comparator. The multiplication circuit outputs a signal obtained by multiplying the error amplified signal and an output voltage of the rectifying device as a second modulated wave. The second comparator circuit compares a second carrier wave, which is generated separately, and the second modulated wave. The second switching element is controlled in response to an output of the second comparator circuit. The phases of the first carrier wave and the second carrier wave, which can be for example saw-tooth waves or triangular waves, are different from each other by 180°.

DETAILED DESCRIPTION

Figure 1:
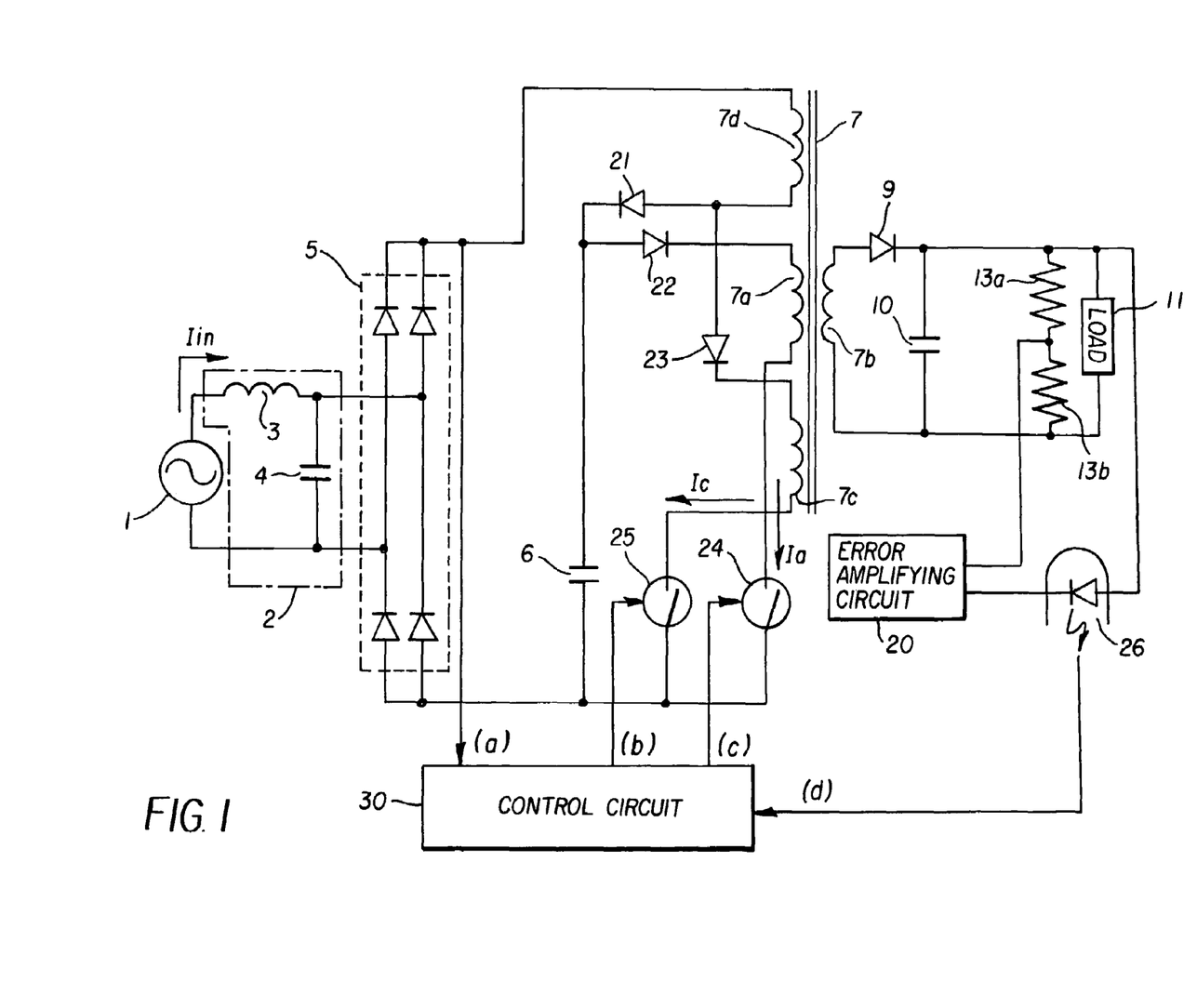
FIG. 1 illustrates a circuit diagram of the first embodiment of the present invention.

Referring to FIG. 1, a first embodiment of a switching power source device according to the present invention includes a transformer 7 with first, second, and third primary windings 7a, 7c, 7d and a secondary winding 7b, first, second, and third diodes 21, 22, 23, first and second switching elements 24, 25, and a control device or circuit 30 for the switching elements 24, 25. Other constitutional elements that correspond to the elements illustrated in FIGS. 5 and 6 are given same reference numerals.

A full-wave rectifying voltage output from the bridge rectifying device or circuit 5 is supplied to a first series circuit constituted of the first primary winding 7a and the switching element 24 through the third primary winding 7d, and the diodes 21, 22. That is, the first series circuit is connected to the output (positive and negative terminals) of the rectifying device 5. The smoothing capacitor 6 is connected between the connection of the diodes 21, 22, which are connected to each other in series, and a negative-side output terminal of the bridge rectifying circuit 5. The smoothing capacitor 6, the second diode 22, the first primary winding 7a, and the first switching element 24 forms a (third) series circuit. By turning ON or OFF the switching element 24, the voltage smoothed by the smoothing capacitor 6 is interrupted, and the interrupted voltage is supplied to the secondary side of the transformer 7 through the secondary winding 7b.

Further, the above-mentioned full-wave rectifying voltage is also supplied to a second series circuit constituted of the second primary winding 7c and the switching element 25 through the fourth winding 7d and the diode 23. That is, the second series circuit is connected to the output terminals of the rectifying device. By turning ON or OFF the switching element 25, the full-wave rectifying voltage is interrupted and is supplied to the secondary side of the transformer 7 through the secondary winding 7b. At the secondary side, the voltage obtained from the secondary winding 7b is rectified and smoothed by the diode 9 and the smoothing capacitor 10, and is supplied to the load 11 as a substantially fixed DC voltage. The control circuit 30 is provided for performing an ON-OFF control of the switching elements 24, 25 to hold the above-mentioned DC current at a given fixed value.

The embodiment of FIG. 5 also has a fourth circuit constituted of the third primary winding 7d, the first diode 21, the smoothing capacitor 6. The fourth circuit is connected to the output terminals of the rectifying circuit 5.

The present device further includes an error amplifier 20 that compares a detection value of the DC voltage with a predetermined voltage set value and generates an error amplified signal to eliminate any deviation between both voltage values. The control circuit 30 determines an ON-OFF duty of the switching elements 24, 25 based on the error amplified signal and performs a PWM (pulse width modulation) control of the switching elements 24, 25. The device further includes a light emitting element 26, such as an LED or the like, constituting a photo coupler emits light in response to an output signal (an error amplified signal) of the error amplifier 20 and an optical output is supplied to a light receiving element 39 contained the inside of the control circuit 30 (see FIG. 2). Here, the ON-OFF control of the switching elements 24, 25 is performed using waveforms that are synchronous with the power source voltage, and is performed to turn ON and OFF the switching elements 24, 25 alternately. The method for controlling the switching elements 24, 25 using the control circuit 30 is explained hereinafter.

Figure 2:
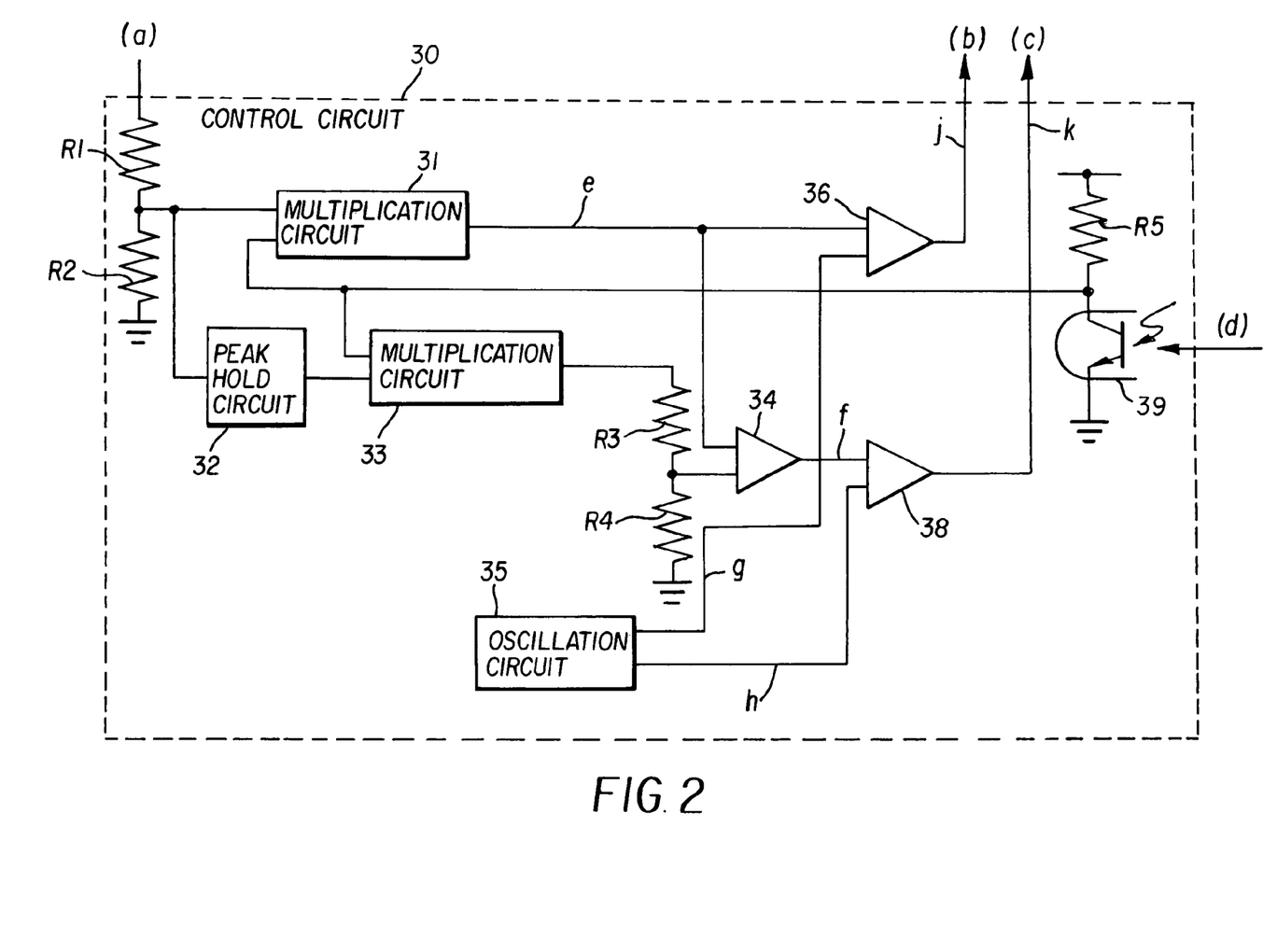
FIG. 2 illustrates the constitution of a control circuit in FIG. 1.

FIG. 2 illustrates the constitution of the control circuit 30 and FIGS. 3A–3G illustrate waveforms at respective points of FIGS. 1 and 2. In FIGS. 3A–3G, waveforms e, f, g, h, j, k, Ia, Ic, and Iin correspond to waveforms taken at portions e, f, g, h, j, k, Ia, Ic, and Iin of FIGS. 1 and 2. The control circuit includes multiplication circuits 31, 33, a peak hold circuit 32, an inverting and amplifying circuit 34, an oscillation circuit 35, a first comparator circuit 38, and a second comparator circuit 36. The oscillation circuit 35 outputs saw-tooth waves having periods in which no output is present (intermittent periods t) in one cycle T and two waveforms having phases different from each other by 180° are output as a first carrier wave h and a second carrier wave g.

To the node (a) of the control circuit 30, an output voltage detected value of the bridge rectifying circuit 5 shown in FIG. 1 is input, and this voltage detected value is input to the multiplication circuit 31 and the peak hold circuit 32 through a series connection point of resistances R1, R2. Into the node (d) of the control circuit 30, an output light of the light emitting element 26 corresponding to an output signal of the above-mentioned error amplifying circuit 20 is input. The output light received by the light receiving element 39, such as a phototransistor or the like, which is connected to the resistance R5, is converted into an electric signal (corresponding to the error amplified signal). Further, control signals of the switching elements 25, 24 are respectively output from the nodes (b), (c) of the control circuit 30 using the comparator circuits 36, 38.

Figure 3A:
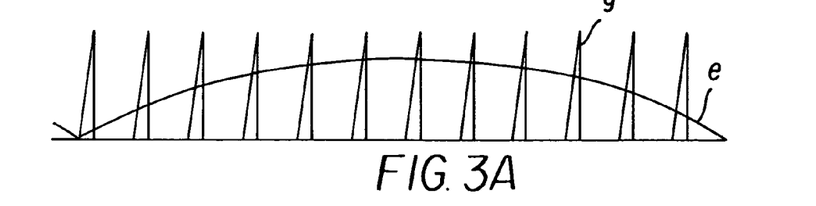
FIGS. 3A–3G illustrate waveforms that explain the operation of the first embodiment.
Figure 3B:
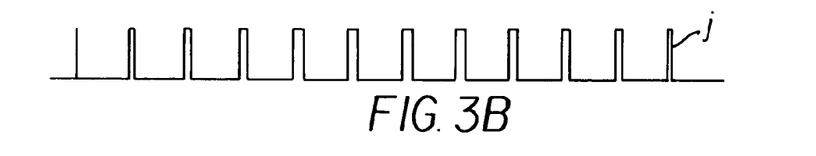
Figure 3C:
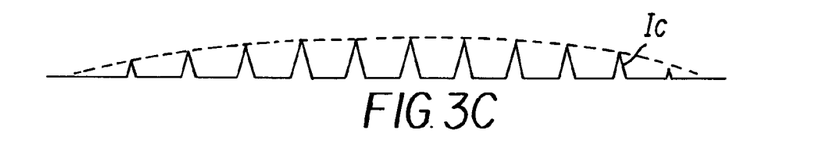

To the multiplication circuit 31 shown in FIG. 2, an output voltage detected value of the bridge rectifying circuit 5 and the above-mentioned error amplified signal, which is converted by the light receiving element 39, are input. Hence, the multiplication circuit 31 computes the product of the output voltage detected value and the error amplified signal, and outputs the product value as the second modulated wave e (FIG. 3A). The comparator circuit 36 compares the second modulated wave e and the above-mentioned second carrier wave g and generates a pulse j (FIG. 3B), which is a control signal to the second switching element 25. The switching element 25 is turned ON or OFF in response to the pulse j, and the current Ic shown in FIG. 3C flows to the third primary winding 7d and the second primary winding 7c of the transformer 7.

Further, in FIG. 2, the output voltage detected value of the bridge rectifying circuit 5 is also input to the peak hold circuit 32 and a peak value of a pulse-current voltage output from the bridge rectifying circuit 5 is held and output. The peak value is multiplied with the error amplified signal in the multiplication circuit 33.

Figure 3D:
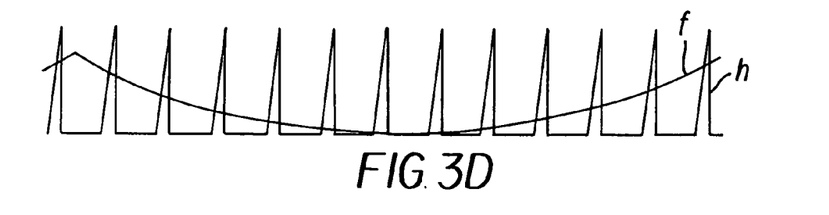
Figure 3E:
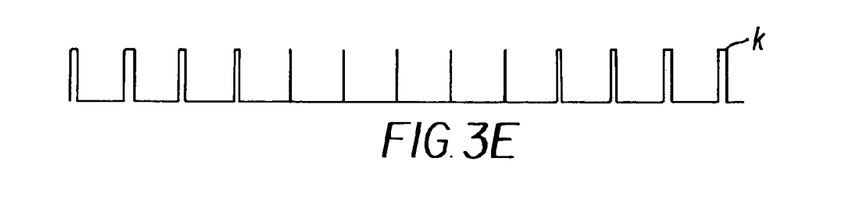

To the inverting and amplifying circuit 34, an output of the multiplication circuit 33, which is divided by the resistances R3, R4 (having the same resistance values), and an output e of the multiplication circuit 31 are input, and the output e of the multiplication circuit 31 is inverted and amplified, thus obtaining an output f shown in FIG. 3D. Here, since the output of the multiplication circuit 33 is input to the inverting and amplifying circuit 34 by being magnified ½ times using the resistances R3, R4, it is possible to obtain a first modulated wave f having a crest value equal to a crest value of the output e of the multiplication circuit 31.

In the comparator circuit 38, the first modulated wave f and the first carrier wave h (FIG. 3D) output from the oscillation circuit 35 are compared to each other, and a pulse k (FIG. 3E), which constitutes a control signal supplied to the first switching element 24, is generated. The switching element 24 is turned ON or OFF in response to the pulse k (FIG. 3E), and current Ia (FIG. 3F) flows in the third primary winding 7d and the first primary winding 7a of the transformer 7. Further, the waveform of a current Iin inputted from the AC power source I assumes a substantially sinusoidal waveform as shown FIG. 3G.

According to this embodiment, energy stored in the third primary winding 7d when the switching elements 24, 25 assume the ON state is stored in the smoothing capacitor 6 through the diode 21 when the switching elements 24, 25 assume the OFF state and hence, the smoothing capacitor 6 is boosted. Accordingly, the peak value of the input current is decreased and, at the same time, the conduction angle is increased. Hence, the waveform of the input current can have the waveform similar to the waveform of the input voltage, making it possible to set the power factor to substantially 1. Further, by controlling the input current waveform such that the input current waveform assumes the substantially sinusoidal waveform, it is also possible to suppress the higher harmonic waves. Further, it is possible to decrease an effective current supplied to the switching element 24 due to boosting of the smoothing capacitor 6. Hence, the efficiency of the operation of the switching element 24 can be enhanced due to the reduction of ON loss of the switching element 24.

Figure 4:
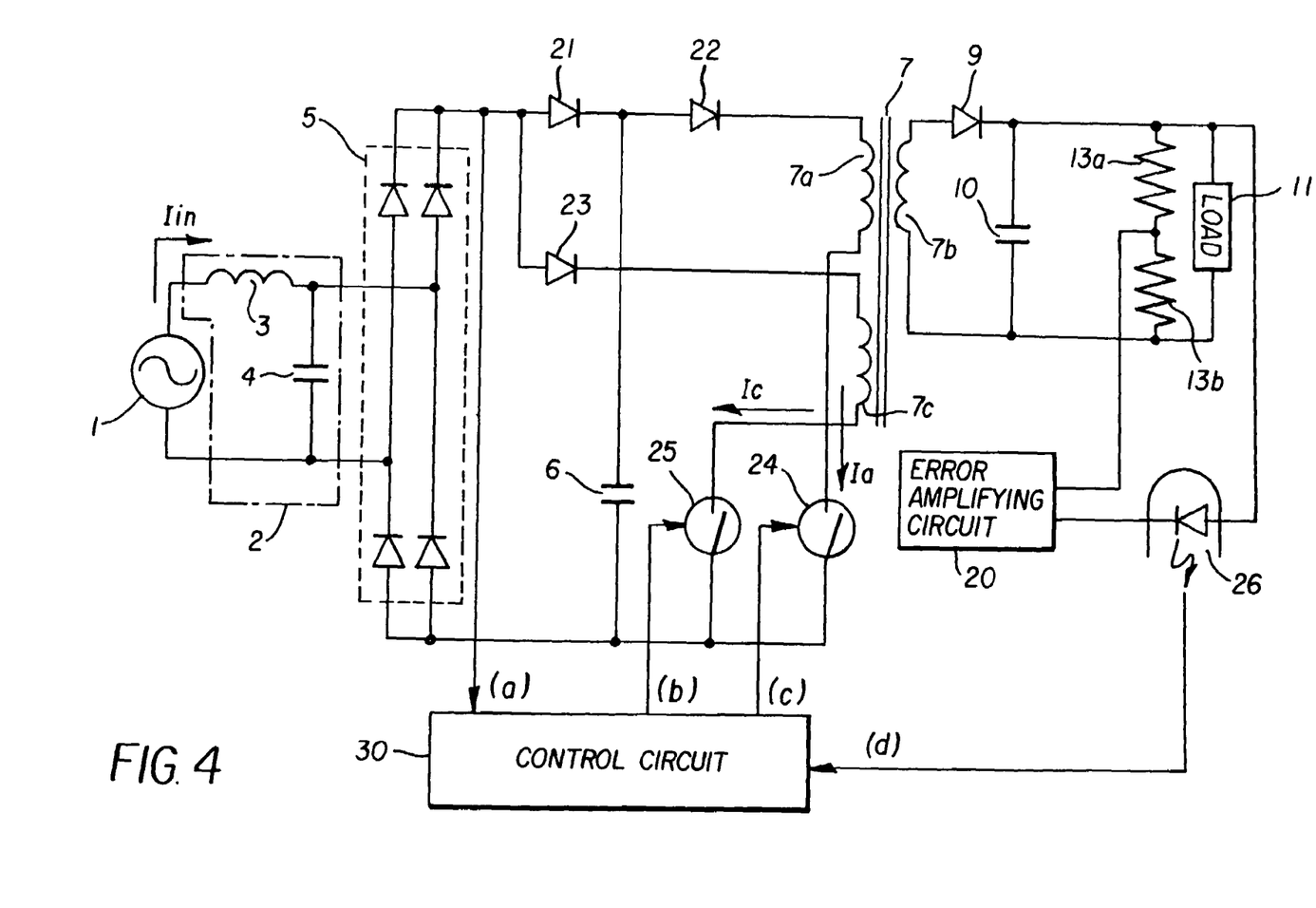
FIG. 4 illustrates a circuit diagram of the second embodiment of the present invention.

FIG. 4 is a circuit diagram showing the second embodiment of the present invention. In the drawing, same reference numerals are given to constitutional elements corresponding to those shown in FIG. 1. The second embodiment is different from the first embodiment shown in FIG. 1 in that the third primary winding 7d show in FIG. I is eliminated, and both anodes of the first and third diodes 21, 23 are connected to the positive-side output terminal of the bridge rectifying circuit 5 in the second embodiment. This embodiment also has the first, second, third, and fourth series circuits, but without the third primary winding. All other elements, including the control circuit 30 are the same as in the first embodiment.

Figure 3F:
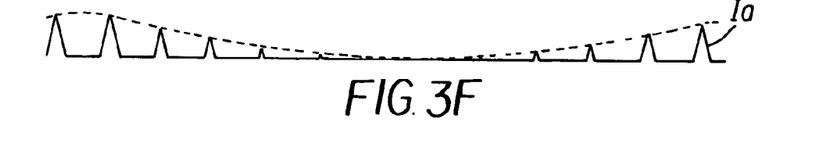
Figure 3G:
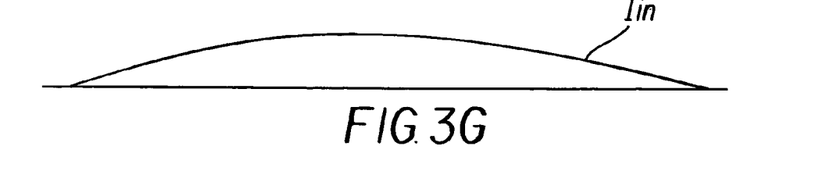

Also, in the second embodiment, the waveforms of currents flowing in the switching elements 24, 25 assume waveforms indicated by Ic (FIG. 3C) and Ia (FIG. 3F). Hence, it is possible to enhance a power factor by forming the waveform of an input current Iin into a substantially sinusoidal waveform and, at the same time, the higher harmonic waves can be suppressed. Further, in the second embodiment, as the third primary winding 7d is eliminated, it is possible to realize the miniaturization, the reduction of weight, and the reduction of cost of the transformer 7.

In the second embodiment, as the first and second carrier waves h, g, which serve for a PWM control of the switching elements 24, 25, two saw-tooth waves that have an equal amplitude and an intermittent period while making phases thereof different from each other by 180° are used. These two saw-tooth waves can be generated by alternately distributing the saw-tooth waves based on the continuous saw-tooth wave. The length of the intermittent period is approximately 75% with respect to a cycle T in the above-mentioned example.

The carrier wave is not limited to the saw-tooth wave, and a triangular wave can be used. Also, in this case, the intermittent period is provided for alternately turning ON and OFF two switching elements 24, 25. Alternatively, a control of the switching elements 24, 25 can be performed as follows. That is, to alternately turn ON and OFF these two switching elements 24, 25, means for detecting currents that flow in respective switching elements 24, 25 (not shown in the drawing) can be provided, where the current detecting means detects that the current at the secondary side of the transformer 7 becoming zero after one switching element assumes an ON state for a given period, and another switching element is made to assume an ON state for a given period.

In the above-mentioned respective embodiments, the first and second primary windings 7a, 7c have the same number of turns. However, the present invention is not limited to such a constitution. For example, the number of turns of the second primary winding 7c can be set larger (or smaller) than the number of turns of the first primary winding 7a, and the amplitude of the carrier wave used in the PWM control of the switching element 25 connected to the second primary winding 7c in series can be made small (or large). That is, the ON-OFF duties of the respective switching elements 24, 25 can be changed in response to the number of turns of the first and second primary windings 7a, 7c of the transformer 7. Hence, the degree of freedom in selection of the transformer is increased.

The switching element 24, 25 can be a semiconductor switching element that can be turned ON and OFF at a high speed (for example, MOSFET). In the example shown in FIG. 3, for convenience of illustration, the frequency of the carrier wave is indicated as a low frequency. However, in an actual operation, it is possible to perform switching at a frequency of several 10 kHz in accordance with the characteristics of the switching element. Since the first and the second switching elements 24, 25 are alternately turned ON and OFF in respective embodiments, in an actual operation, a voltage having a frequency twice as large as the switching frequency of each switching element 24, 25 at the secondary side of the transformer 7 is induced.

Although two switching elements are used in the embodiment of FIG. 6, a current that flows in the primary winding 7a also flows through both of the switching elements 8, 14 in FIG. 6. Hence, the loss in the switching elements is large. To the contrary, in the circuit shown in FIGS. 1 and 4, the currents (currents being substantially half of the current shown in FIG. 6) flowing in the windings 7a, 7c respectively flow in the switching elements 24, 25. Hence, it is possible to use miniaturized switching elements with a small loss in the switching elements. Further, the choke coil 17 and the inductor 19 shown in FIGS. 5 6 are no longer necessary. Accordingly, with the provision of the miniaturized switching elements and the elimination of the choke coil or the like, the miniaturization of the switching power source device is facilitated. Further, the generation of heat in the switching elements can be minimized. Hence, it is possible to obtain the high degree of freedom in design to cope with the heat radiation.

Further, by integrating the control circuit 30 to the semiconductor thus forming one IC, it is possible to house the control circuit 30 together with one or both of two switching elements in the same package. Further, by housing these circuit elements in the same package together with other protective circuits and the like, a wiring and connecting operation at the user side is facilitated. Further, it may be possible to provide a semiconductor device that integrates an IC portion that constitutes a control circuit and high dielectric strength switching elements on one semiconductor substrate using a die separation technique.

In the above-mentioned respective embodiments, the secondary-side voltage of the transformer 7 is detected, the error amplification is performed on the detected value at the secondary side of the transformer 7 and, thereafter, the detected value is input to the control circuit 30 by way of the photo coupler in an insulating manner. However, the voltage generated at the secondary side of the transformer 7 can be directly detected by providing another winding (not shown in the drawing) at the secondary side of the transformer 7 and the detected value can be input to the control circuit 30. In this case, although the constitution of the transformer becomes slightly complicated, the circuit constitution of the secondary side of the transformer 7 becomes simplified.

As has been explained heretofore, according to the present invention, the conducting period of the input current can be prolonged. Hence, the waveform of the input current approximates the sinusoidal wave to suppress the generation of the higher harmonic waves, while at the same time the input power factor can be improved. Further, since the choke coil and the inductor are no longer used, the switching power source device can easily cope with the change of the input voltage.

According to the present invention, by alternately turning ON and OFF the first and second switching elements, which are connected to respective primary-side windings of the transformer in series, a conduction angle in response to an input current is increased. Hence, it is possible to improve the power factor and to suppress higher harmonic waves by approximating the waveform of the input current to sinusoidal waves. Particularly, by providing another separate winding to the primary side of the transformer and imparting a function of boosting a voltage of the capacitor connected to the winding in response to turning ON and OFF of the first and the second switching elements, it is possible to decrease the peak value of the input current to remarkably improve the power factor. Further, according to the present invention, as the choke coil and the inductor are eliminated, it is possible to achieve the miniaturization, the reduction of weight, and the reduction of cost of the switching power source device. At the same time, it is possible to provide the switching power source device that can cope with an AC input voltage in a wide range and exhibits a small power loss.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2003-029833 and JP 2003-400970, in their entirety, including the drawings, claims, and the specification thereof, are incorporated herein by reference.

What is claimed is:

1. A switching power source device comprising:
   a rectifying device connectable to an AC power source;
   a smoothing capacitor connected to an output of the rectifying device;
   a transformer having at least first and second primary windings, and a secondary winding;
   first and second switching elements connected to the output of the rectifying device by way of the first and second primary windings of the transformer respectively;
   means for rectifying and smoothing a voltage generated to the secondary winding of the transformer;
   means for outputting error amplified signal for setting a DC current output from the rectifying and smoothing means to a predetermined value;
   a control device that alternately turns ON and OFF the first and second switching elements based on the error amplified signal and an input voltage from the AC power source; and
   a first series circuit formed of at least the first primary winding of the transformer, a diode, and the first switching element, and a second series circuit formed of at least the second primary winding of the transformer, another diode, and the second switching element,
   wherein the first and second series circuits are connected in parallel to form a parallel connection circuit, and the parallel connection circuit being connected to the output of the rectifying device.

2. A switching power source device according to claim 1, wherein the means for outputting the error amplified signal compares a DC output voltage output from the means for rectifying and smoothing to generate the error amplified signal.

3. A switching power source device comprising:
   a rectifying device connectable to an AC power source;
   a smoothing capacitor connected to an output of the rectifying device;
   a transformer having at least first and second primary windings, and a secondary winding;
   first and second switching elements connected to the output of the rectifying device by way of the first and second primary windings of the transformer respectively;
   means for rectifying and smoothing a voltage generated to the secondary winding of the transformer;
   means for outputting error amplified signal for setting a DC current output from the rectifying and smoothing means to a predetermined value; and
   a control device that alternately turns ON and OFF the first and second switching elements based on the error amplified signal and an input voltage from the AC power source,
   wherein the control device comprises:
   an inverting and amplifying circuit that outputs a signal obtained by inverting and amplifying a multiplication value of the error amplified signal and a peak value of an output voltage of the rectifying circuit by ½ times as a first modulated wave; and
   a first comparator circuit that compares a first carrier wave, which is generated separately, and the first modulated wave,
   wherein the first switching element is controlled in response to an output of the first comparator circuit.

4. A switching power source device according to claim 3, wherein the means for outputting the error amplified signal compares a DC output voltage output from the means for rectifying and smoothing to generate the error amplified signal.

5. A switching power source device according to claim 3, wherein the control device further includes:
   a multiplication circuit that outputs a signal obtained by multiplying the error amplified signal and an output voltage of the rectifying device as a second modulated wave; and
   a second comparator circuit that compares a second carrier wave, which is generated separately and the second modulated wave,
   wherein the second switching element is controlled in response to an output of the second comparator circuit.

6. A switching power source device according to claim 5, wherein phases of the first carrier wave and the second carrier wave are different from each other by 180°.

7. A switching power source device comprising:
   a rectifying device connectable to an AC power source;
   a transformer having first, second, and third primary windings, and a secondary winding;
   a series circuit including the third primary winding of the transformer connected between positive-side and negative-side output terminals of the rectifying device, a first diode, and a smoothing capacitor;
   another series circuit including a second diode connected to both ends of the smoothing capacitor, the first primary winding of the transformer, and a first switching element;
   an additional series circuit including a third diode connected between the third primary winding and the first diode and the negative-side output terminal of the rectifying device, the second primary winding of the transformer, and a second switching element;
   means for rectifying and smoothing a voltage generated by the secondary winding;
   means for outputting an error amplified signal for setting a DC voltage output from the rectifying and smoothing means to a predetermined value; and
   a control device that performs a PWM control of the first switching element in response to a first modulated wave generated based on an inverted and amplified waveform, which is a product of the error amplified signal and a full-wave rectified waveform of an input voltage from the AC power source, performs a PWM control of the second switching element in response to a second modulated wave generated based on the error amplified signal and the full-wave rectified waveform of the input voltage from the AC power source, and turns ON and OFF the first and second switching elements alternately.

8. A switching power source device according to claim 7, wherein the control device comprises:
- a multiplication circuit that outputs a signal obtained by multiplying the error amplified signal and an output voltage of the rectifying device as a second modulated wave; and
- a second comparator circuit that compares a second carrier wave, which is generated separately, and the second modulated wave,
- wherein the second switching element is controlled in response to an output of the second comparator circuit.

9. A switching power source device according to claim 7, wherein the control device comprises:
- an inverting and amplifying circuit that outputs a signal obtained by inverting and amplifying a multiplication value of the error amplified signal and a peak value of an output voltage of the rectifying device by ½ times as a first modulated wave; and
- a first comparator circuit that compares a first carrier wave, which is generated separately, and the first modulated wave,
- wherein the first switching element is controlled in response to an output of the first comparator circuit.

10. A switching power source device according to claim 9, wherein the control device further includes:
- a multiplication circuit that outputs a signal obtained by multiplying the error amplified signal and an output voltage of the rectifying device as a second modulated wave; and
- a second comparator circuit that compares a second carrier wave, which is generated separately, and the second modulated wave,
- wherein the second switching element is controlled in response to an output of the second comparator circuit.

11. A switching power source device according to claim 10, wherein phases of the first carrier wave and the second carrier wave are different from each other by 180°.

12. A switching power source device comprising:
- a rectifying device connectable to an AC power source;
- a transformer having first and second primary winding and a secondary winding;
- a first series circuit formed of a first diode connected between positive-side and negative-side output terminals of the rectifying device;
- a second series circuit formed of a second diode connected to both ends of a smoothing capacitor, the first primary winding of the transformer, and a first switching element;
- a third series circuit including a third diode connected between the positive-side and the negative-side output terminals of the rectifying device, the second primary winding of the transformer, and a second switching element;
- means for rectifying and smoothing a voltage generated by the secondary winding;
- means for outputting an error amplified signal for setting a DC voltage output from the rectifying and smoothing means to a predetermined value; and
- a control device that performs a PWM control of the first switching element in response to a first modulated wave generated based on an inverted and amplified waveform, which is a product of the error amplified signal and a full-wave rectified waveform of an input voltage from the AC power source, performs a PWM control of the second switching element in response to a second modulated wave generated based on the error amplified signal and the full-wave rectified waveform of the input voltage from the AC power source, and turns ON and OFF the first and second switching elements alternately.

13. A switching power source device according to claim 12, wherein the control device comprises:
- a multiplication circuit that outputs a signal obtained by multiplying the error amplified signal and an output voltage of the rectifying device as a second modulated wave; and
- a second comparator circuit that compares a second carrier wave, which is generated separately, and the second modulated wave,
- wherein the second switching element is controlled in response to an output of the second comparator circuit.

14. A switching power source device according to claim 12, wherein the control device comprises:
- an inverting and amplifying circuit that outputs a signal obtained by inverting and amplifying a multiplication value of the error amplified signal and a peak value of an output voltage of the rectifying device by ½ times as a first modulated wave; and
- a first comparator circuit that compares a first carrier wave, which is generated separately, and the first modulated wave,
- wherein the first switching element is controlled in response to an output of the first comparator circuit.

15. A switching power source device according to claim 14, wherein the control device further includes:
- a multiplication circuit that outputs a signal obtained by multiplying the error amplified signal and an output voltage of the rectifying device as a second modulated wave; and
- a second comparator circuit that compares a second carrier wave, which is generated separately, and the second modulated wave,
- wherein the second switching element is controlled in response to an output of the second comparator circuit.

16. A switching power source device according to claim 15, wherein phases of the first carrier wave and the second carrier wave are different from each other by 180°.

17. A switching power source device comprising:
- a rectifying device connectable to an AC power source;
- a smoothing capacitor connected to an output of the rectifying device;
- a transformer having at least first and second primary windings, and a secondary winding;
- first and second switching elements connected to the output of the rectifying device by way of the first and second primary windings of the transformer respectively;
- means for rectifying and smoothing a voltage generated to the secondary winding of the transformer;
- means for outputting error amplified signal for setting a DC current output from the rectifying and smoothing means to a predetermined value; and a control device that alternately turns ON and OFF the first and second switching elements based on the error amplified signal and an input voltage from the AC power source, wherein the control device includes:

a multiplication circuit that outputs a signal obtained by multiplying the error amplified signal and an output voltage of the rectifying circuit as a second modulated wave; and a second comparator circuit that compares a second carrier wave, which is generated separately, and the second modulated wave, wherein the second switching element is controlled in response to an output of the second comparator circuit.

18. A switching power source device comprising:
a rectifying device connectable to an AC power source;
a smoothing capacitor connected to the rectifying device;
a transformer having at least first and second primary windings;
first and second switching elements connected to the rectifying device; and
a control device that alternately turns ON and OFF the first and second switching elements,
wherein at least the first primary winding, the rectifying device, and the first switching element form a first series circuit,
wherein at least the second primary winding, the rectifying device, and the second switching element form a second series circuit, and
wherein the first series circuit further includes first and second diode connected in series, and the second series circuit further includes a third diode, wherein the first and second series circuits are connected in parallel in relation to the rectifying device.

19. A switching power source device according to claim 18, further including a third series circuit formed of the first primary winding, the second diode, the smoothing capacitor, and the first switching element.

20. A switching power source device according to claim 19, further including a fourth series circuit formed of the smoothing capacitor, the first diode, and the rectifying device.

21. A switching power source device according to claim 18, wherein the transformer further includes a third primary winding, wherein the first and second series circuits each include the third primary winding.

22. A switching power source device according to claim 21, wherein the third primary winding, the first diode, the second diode, and the first primary winding are connected in series.

23. A switching power source device according to claim 21, further including a fourth series circuit formed of the smoothing capacitor, the first diode, the third primary winding, and the rectifying device.

* * * * *